July 25, 1933.  R. A. STOKES ET AL  1,919,400
APPARATUS FOR THE EVAPORATION OF LIQUIDS
Filed June 28, 1930  2 Sheets-Sheet 1
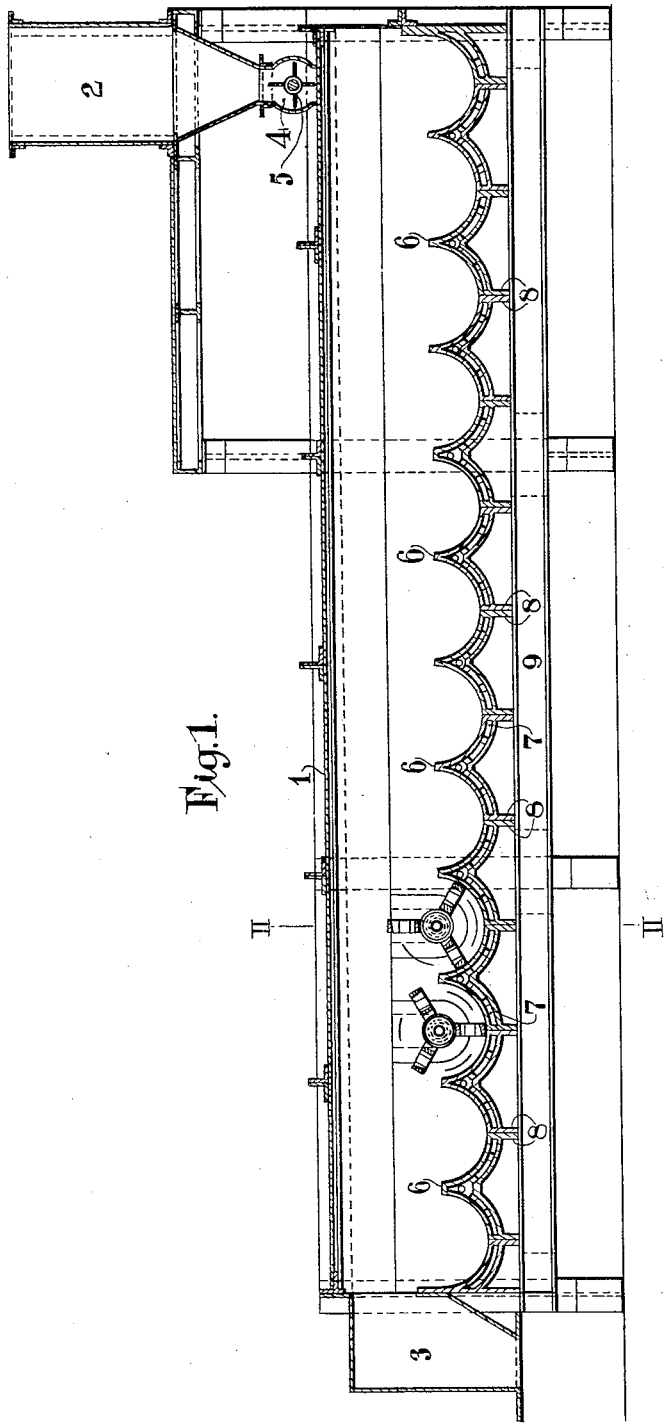

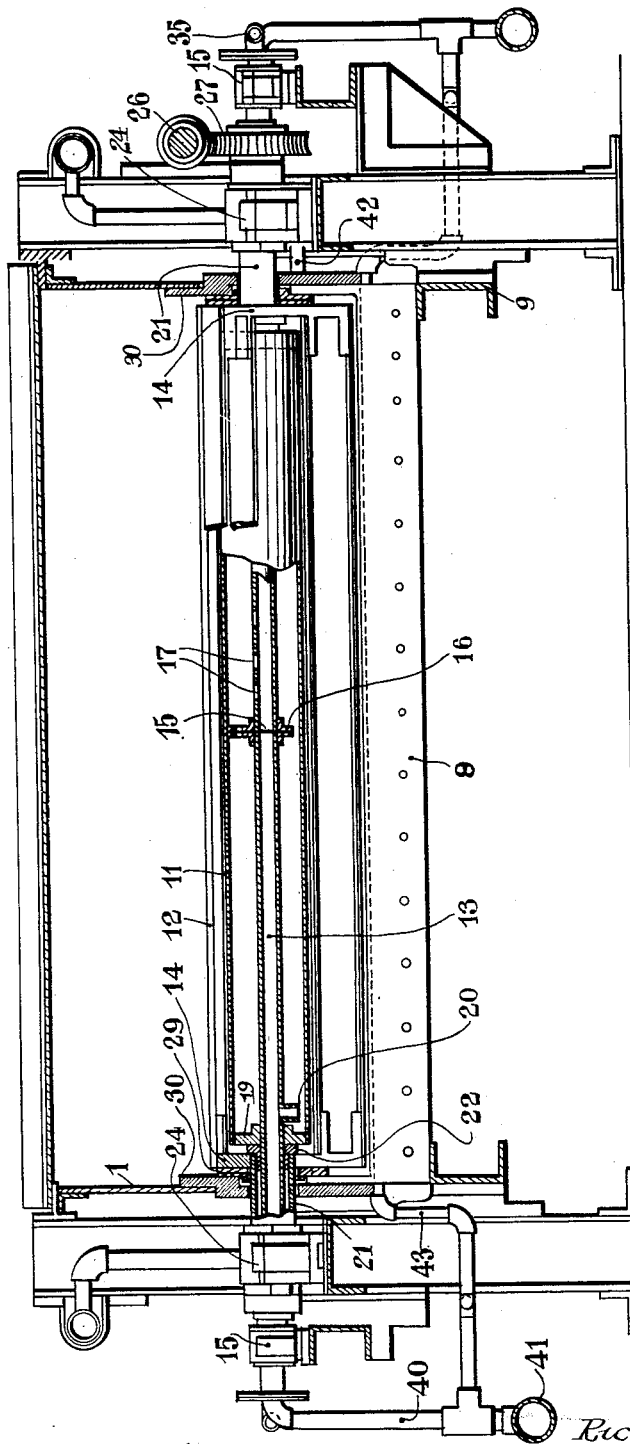

Patented July 25, 1933

1,919,400

UNITED STATES PATENT OFFICE

RICHARD ALBERT STOKES AND EDWIN GILBERT LLEWELLYN ROBERTS, OF LONDON, ENGLAND

APPARATUS FOR THE EVAPORATION OF LIQUIDS

Application filed June 28, 1930, Serial No. 464,618, and in Great Britain November 11, 1929.

In the specification of Letters Patent No. Re. 17,251 and application for patent Serial No. 159,401, there is described a method of distilling or treating coal or similar carbonaceous materials by low temperature methods wherein the material is adapted to be fed transversely over a series of retorts or troughs located side by side.

We have found that a similar method may be adopted for the evaporation of liquids, or the crystallization of salts from their solutions.

Accordingly the present invention consists in a method of evaporating liquids or crystallizing salts from their solutions, which consists in passing the material transversely over a heat exchanger comprising a plurality of open-topped troughs located side by side, upon the upper surface of which the material is adapted to be supported; and supplementary heat exchangers individual to each trough and so positioned in relation thereto as to be substantially submerged within the mass of the material under treatment, and wherein the material is mixed and agitated during its passage over the troughs.

Other features of the invention will be apparent from the following description:—

In order that our invention may be more clearly understood and readily carried into practice a preferred form of apparatus for giving practical effect to the method set out above will now be described with reference to the accompanying drawings, wherein:—

Fig. 1 shows a longitudinal section of the apparatus, and

Fig. 2 is a section on the line 11—11 of Fig. 1.

Referring now to the drawings:

The apparatus comprises an outer casing 1, having at one end a feed hopper 2 for the material, and an outlet 3 at the opposite end of the apparatus. A feed regulator 4 of the usual construction is rotatably mounted in the neck 5 of the hopper.

The supporting surface of the material within the casing comprises a plurality of troughs 6 of substantially semi-circular cross-section, the troughs being formed of a number of similar members in the manner shown, each having provided a jacket 7 for the heating or cooling medium together with the necessary inlet and outlet, and two downwardly extending flanges 8 whereby the members may be bolted or otherwise secured together, these flanges further acting as supports for the trough upon the longitudinally disposed channels 9.

The agitating means for the material within each trough comprises a plurality of longitudinally disposed rods or bars 12 arranged around a fixed tube 13 axially disposed in relation to the trough, the rods or bars 12 being secured to discs 14 located at each end of the trough and being rotated by means which will be hereinafter described, it being understood that one or more of the troughs may be so provided with agitating means.

The fixed tube 13 extends through the casing and is supported upon bearings 15 external thereto, the tube being formed in two parts connected together by perforated flanges 16. This tube 13 serves for the passage of heating or cooling medium and is provided on one half with a plurality of holes 17 for the passage of the water to an outer concentric barrel 11 fixed at each end to the tube 13 by means of circular flanges 19. The other half of the tube 13 is provided with an inlet 20 in the position shown.

At each end of the fixed tube 13 there is provided concentric tubes 21, having packing glands 22, these tubes 21 projecting through the outer casing 1 and being supported on bearings 24 external to the casing.

The discs 14 carrying the rods or bars 12 forming the agitating means are each secured to the inner ends of the tube 21, and together with each set of agitating bars are rotated by means of worm 26 and wheel 27, the latter being keyed or otherwise secured to one of the concentric tubular members 21. The rotatable discs 14 cooperate with external closing rings 29, and the casing with a closing plate 30.

The heating or cooling medium is fed from the main 35 to the interior of one part of the tube 13 passing through the holes 17 into the tubular member 11 by which means a large area of heating or cooling surface is brought into contact with the material within the troughs 6. The waste medium passes through the tubular member 11 into the inlet 20 in the other part of the tube 13, and thence to the downward extension 40 to the outlet main 41. Heating or cooling medium is also supplied to the troughs through the pipes 42 communicating with the jackets 7 passing therethrough to the outlet pipe 43 and from thence to the outlet main 41.

The longitudinally disposed rods or bars forming the agitating means for the material may be straight or helically disposed or otherwise arranged, and, if necessary, may be provided with straight or curved transversely disposed connecting members, while in cases where the material in the troughs is likely to be injured by violent impacts, the outer edges of the agitating members may be provided with brushes or other resilient members.

We wish it to be understood that the above described construction is given by way of illustration only and that various modifications may be made therein; for example, the troughs may be arranged in banks or tiers or otherwise suitably disposed in relation to each other, and also the means employed for feeding the material to the troughs may be varied. Furthermore, the method of conveying the heating or cooling medium to the jackets and the tubular members may be modified, and any modifications may be made in the construction consequent thereon or as may be necessitated by the particular material with which the apparatus is intended to deal.

Having thus described our invention what we claim and desire to secure by Letters Patent is:—

1. Apparatus for the evaporation of liquids, the drying of materials and the crystallization of salts from their solutions, comprising a heat exchanging and supporting floor for the material, formed by a plurality of open topped straight sided troughs located side by side and in abutting relationship over which the material is adapted to be passed transversely; supplementary heat exchangers each taking the form of a tubular member extending longitudinally over its associated trough and in spaced relation thereto; and agitating and mixing members independent of the heat exchangers which serve to sweep over both the upper surface of the supporting floor and the external surfaces of the supplementary heat exchangers, and means to effect the relative movement of the agitating and mixing members.

2. Apparatus for the evaporation of liquids, the drying of materials and the crystallization of salts from their solutions, comprising a heat exchanging and supporting floor for the material, formed of a plurality of open topped straight sided troughs located side by side and in abutting relationship over which the material is adapted to be passed transversely, jackets associated with the heat exchanging and supporting floor for the passage of heating or cooling medium; supplementary heat exchangers each extending longitudinally over its associated trough and formed as a hollow drum for the passage of heating or cooling medium; agitating and mixing members associated with each trough and comprising a plurality of longitudinally extending rods in fixed relation to each other, and means for rotating the rods whereby they sweep both the upper surface of the supporting floor and the external surface of the drum.

3. Apparatus for the evaporation of liquids, the drying of materials, and the crystallization of salts from their solutions, comprising a heat exchanging and supporting floor for the material, formed by a plurality of open topped straight sided troughs located side by side and in abutting relationship over which the material is adapted to be passed transversely, a jacket associated with each trough for the passage of heating or cooling medium; supplementary heat exchangers each extending longitudinally over its associated trough and formed as a hollow drum for the passage of heating or cooling medium; agitating and mixing members associated with each trough and comprising a plurality of longitudinally extending rods secured at each end to a common member, and means for rotating the rods in unison whereby they sweep both the upper surface of the supporting floor and the external surface of the drum.

4. Apparatus for the evaporation of liquids, the drying of materials and the crystallization of salts from their solutions, comprising a heat exchanging and supporting floor for the material, formed by a plurality of open topped straight sided troughs located side by side and in abutting relationship over which the material is adapted to be passed transversely, a jacket associated with each trough for the passage of heating or cooling medium; supplementary heat exchangers each extending longitudinally over its associated trough and formed as a hollow drum in fixed relation to the apparatus; agitating and mixing members associated with each trough and comprising a plurality of longitudinally extending rods secured at each end to a common member, and means for rotating the rods in unison whereby they sweep both the upper surface of the supporting floor and the external surface of the drum.

5. Apparatus for the evaporation of liquids, the drying of materials and the crystallization of salts from their solutions, comprising a heat exchanging and supporting floor for the material, formed of a plurality of open topped straight sided troughs located side by side and in abutting relationship over which the material is adapted to be passed transversely, jackets associated with the heat exchanging and supporting floor for the passage of heating or cooling medium; supplementary heat exchangers each extending longitudinally over its associated trough and formed as a hollow drum for the passage of heating or cooling medium; agitating and mixing members associated with each trough and comprising a plurality of longitudinally extending rods in fixed relation to each other, resilient members mounted upon the longitudinally extending rods whereby they sweep both the upper surface of the supporting floor and the external surface of the drum.

6. Apparatus for the evaporation of liquids, the drying of materials and the crystallization of salts from their solutions, comprising a heat exchanging and supporting floor for the material, formed by a plurality of separate open topped straight sided troughs located side by side and in abutting relationship and of uniform size and shape whereby each trough forms a self contained unit; supplementary heat exchangers each taking the form of a tubular member extending longitudinally over its associated trough and in spaced relation thereto; and agitating and mixing members independent of the heat exchangers which serve to sweep over both the upper surface of the supporting floor and the external surfaces of the supplementary heat exchangers, and means to effect the relative movement of the agitating and mixing members.

7. Apparatus for the evaporation of liquids, the drying of materials and the crystallization of salts from their solutions, comprising a heat exchanging and supporting floor for the material, formed of a plurality of open topped straight sided troughs located side by side and in abutting relationship of uniform size and shape and over which the material is adapted to be passed transversely, jackets for heating or cooling medium associated with each trough, whereby each jacketed trough forms a self contained unit; supplementary heat exchangers each extending longitudinally over its associated trough and formed as a hollow drum for the passage of heating or cooling medium; agitating and mixing members associated with each trough and comprising a plurality of longitudinally extending rods in fixed relation to each other, and means for rotating the rods in unison whereby they sweep both the upper surface of the supporting floor and the drum.

RICHARD ALBERT STOKES.
EDWIN GILBERT LLEWELLYN ROBERTS.